United States Patent [19]

Wilson et al.

[11] Patent Number: 4,545,247

[45] Date of Patent: Oct. 8, 1985

[54] BALANCE WORK SUPPORT AND CHUCK

[75] Inventors: Louis D. Wilson; Patrick Jones, both of Folsom, Calif.

[73] Assignee: Drive Line Service, Inc., West Sacramento, Calif.

[21] Appl. No.: 536,358

[22] Filed: Sep. 27, 1983

[51] Int. Cl.⁴ ............................................. G01M 1/04
[52] U.S. Cl. ...................................... 73/473; 73/466
[58] Field of Search ............... 73/462, 466, 471, 473, 73/475–477

[56] References Cited

U.S. PATENT DOCUMENTS

| 2,594,581 | 4/1952 | Phelps | 73/475 |
| 3,090,237 | 5/1963 | Ongaro | 73/462 |
| 3,758,098 | 9/1973 | Vrilakas | 269/55 |
| 3,805,624 | 4/1974 | Martin | 73/462 |
| 4,009,612 | 3/1977 | Johnson | 73/480 |

Primary Examiner—Stewart J. Levy
Assistant Examiner—John E. Chapman, Jr.
Attorney, Agent, or Firm—Mark C. Jacobs

[57] ABSTRACT

A balance support and chuck for use in an apparatus for performing work on workpieces such as automotive drive shafts, said work stations having a fixed headstock at one end and a laterally adjustable tailstock at the other end. The balance support and chuck may be coupled to an off-balance indicator for measurement of the amount of imbalance in a workpiece. The chuck has a supporting bearing assembly which rests on a surface of greater curvature in the balance support.

9 Claims, 9 Drawing Figures

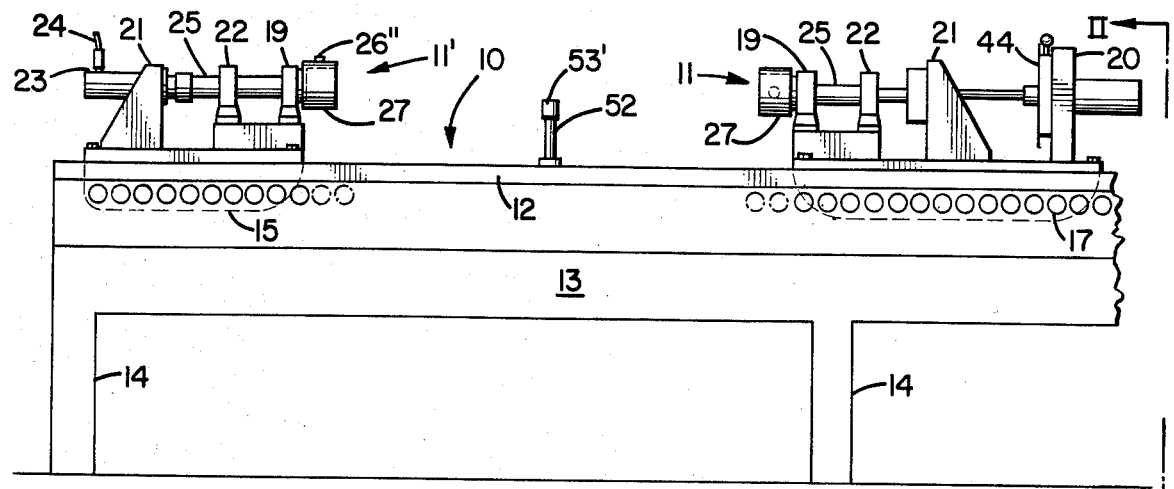
FIG. 1
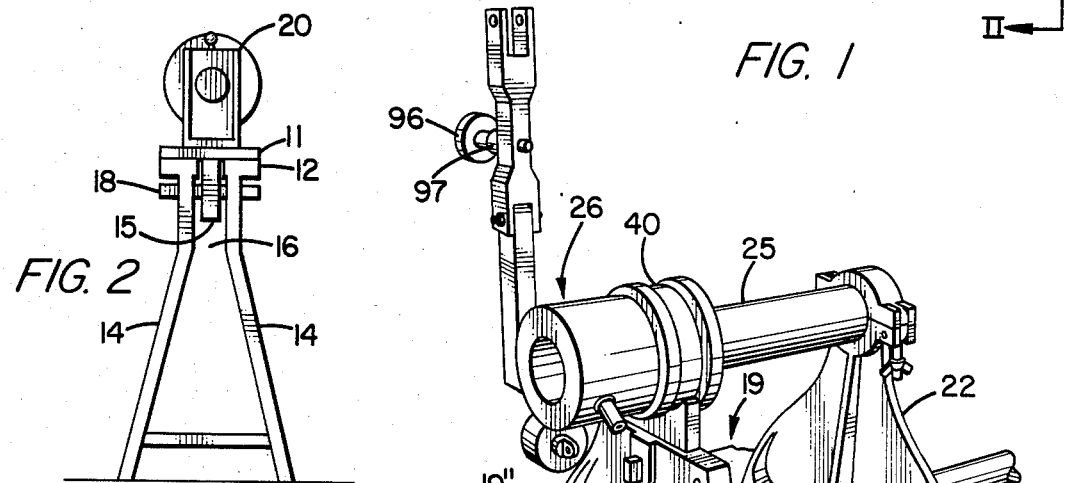
FIG. 2
FIG. 3
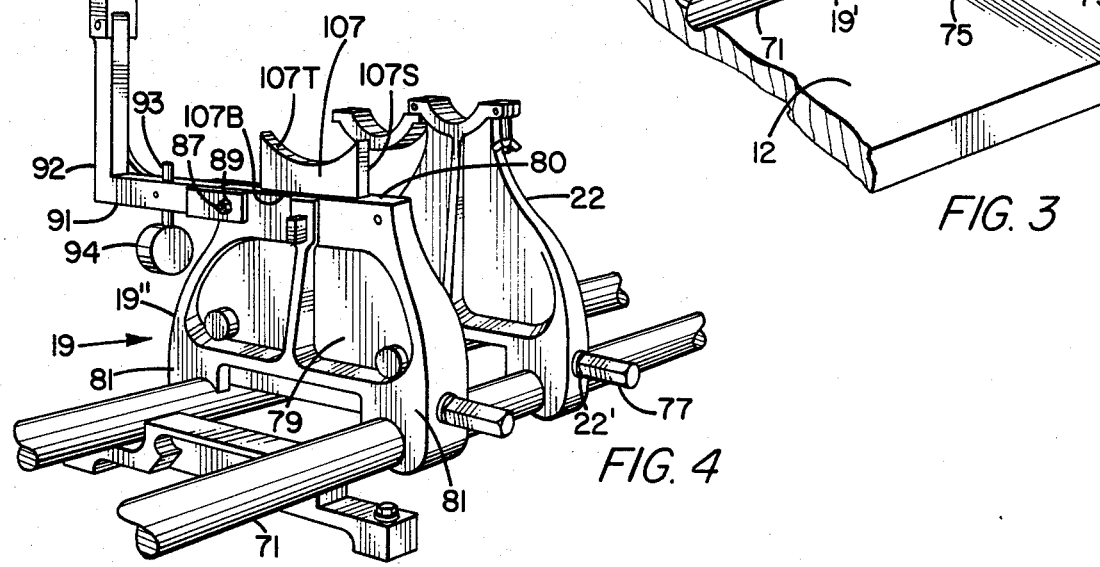
FIG. 4

BALANCE WORK SUPPORT AND CHUCK

BACKGROUND OF THE INVENTION

1. Field of the Invention

The invention relates to machines; and, more particularly, to a machine for performing work operations on a workpiece, e.g. balancing a drive shaft.

2. Description of the Prior Art

U.S. Pat. No. 3,758,098, disclosed a machine for performing various operations on drive shafts. In one of the embodiments of the patent, there is disclosed a means for providing a balancer on the same machine to indicate if a drive shaft was out of balance thereby permitting use of conventional balancing techniques to bring the shaft within desired balance limits on the same machine. Although no particular balancer was described in my patent, there is a need for such a device on such machines which is adapted, in one position, to hold a drive shaft firmly in position on the machine so that the operations described therein can be carried out. After such operations, the shaft should be able to be balanced by using the same device which held the shaft in the first position. This is not true of the machine in the patent nor of any such machine in the prior art.

SUMMARY OF THE INVENTION

It is an object of this invention to provide a new balance work support for use in work stations having a headstock and tailstock on which various functions are performed on workpieces.

It is another object to provide an imposed balancing support and chuck for balancing the imbalance in workpieces.

Yet another object is to provide a balance work support that can be coupled to a meter to read out the degree of imbalance in a workpiece being operated upon.

It is a yet further object to provide an improved support and chuck for balancing automotive drive shafts.

These and other objects will be readily understood by reference to the following detailed description taken in conjunction with the accompanying drawings.

BRIEF DESCRIPTION OF THE FIGURES

FIG. 1 is a vertical view of a work station adapted to be used as a machine for working on drive shafts or the like.

FIG. 2 is a view taken along lines ll—ll of FIG. 1.

FIG. 3 is a left perspective view of a variant of a portion of the apparatus of FIG. 1.

FIG. 4 is a view similar to FIG. 3 but without the chuck shown in FIG. 3.

DESCRIPTION OF THE PREFERRED EMBODIMENT

Figure 5:
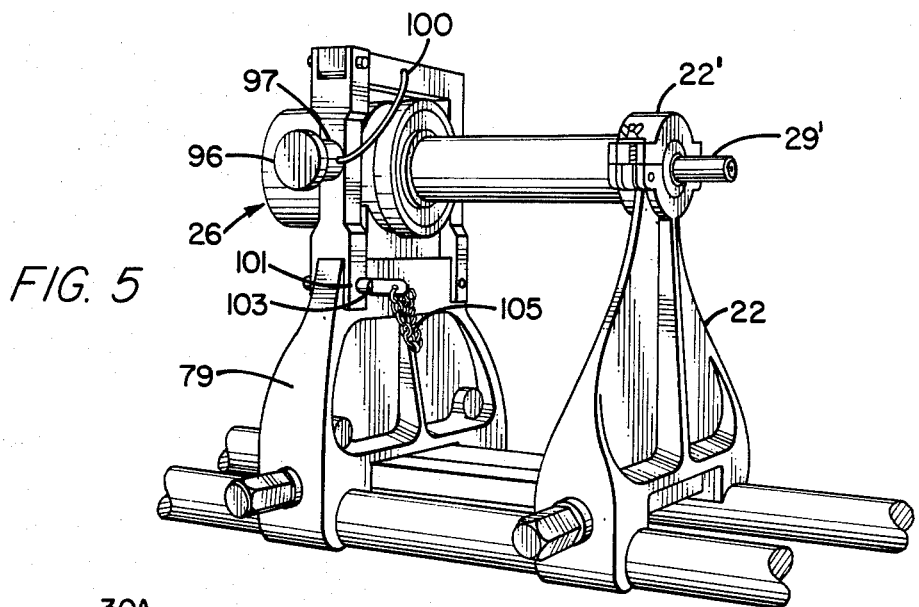
FIG. 5 is a rear perspective view of the portion of the apparatus shown in FIG. 3.

Referring now to FIG. 1 of the drawing, a work station 10 is shown having a right base 11 and a left base 11'. Bases 11 and 11' (only base 11 will be described unless otherwise indicated, the bases 11 and 11' being essentially identical in parts thereof) are shown as installed on an elongated bed 12 of a main frame 13, which bed 12 and frame 13, supported by legs 14, is to be understood as being a part of a machine for working on drive shafts, as for example, the machine disclosed in U.S. Pat. No. 3,758,098 to Vrilakas. Thus, as indicated in U.S. Pat. No. 3,758,098, the base 11 herein may include a rib 15 (FIG. 2) extending down into space 16 having at least one transversely extending opening of the same general size as transversely aligned apertures 17 (FIG. 1) arranged in an extensive series along frame 13. As discussed in U.S. Pat. No. 3,758,098, the teachings of which are incorporated herein by reference, a bar 18 may be inserted into the apertures 17 and openings in rib 15 to lock the base 11 in position. Further, additional clamping means in the form of studs may hold the station 10 in position, such studs working against the surface of base 11. Thus, station 10 (both right and left bases 11,11') can be firmly locked in any desired position. Such studs are not seen in the figures, however.

Referring again to FIG. 1, with regard to both bases 11 and 11' except where otherwise indicated, spaced upstanding self-aligning bearing members 22 are provided on station 10 spaced from each other. As will be discussed, a dynamic balancing apparatus 19 in accordance with the invention is provided on each side of the work station 10. A bracket 21 is mounted on station 10 spaced from member 22. An upstanding flange member 20 (only on base 11) on station 10 is spaced from member 21. The right member 22 and right apparatus 19 form a tailstock when retaining therein a chuck as will be discussed; the left members 19 and 22, also with a chuck therein, form a headstock. As can be seen in FIG. 1, a hydraulic ram or cylinder 23 is mounted in bracket 21 on base 11' coupled by a hydraulic fluid line 24 to a source of hydraulic fluid (not shown). Suitable controls may be provided for actuating cylinder 23 as is well known in the art. For example, a foot pedal arranged as disclosed in U.S. Pat. No. 3,758,098 may be provided.

While all of these drive shaft work stations operate on the same general principles such as discussed in reference to FIGS. 1 and 2, there are some details that are different. One difference constitutes the use of a parallel rail system wherein the two rails are held apart by spacers. In such a system, rather than moving together relative to each other on a base 11, each of 19 and 22 may move separately along the pair of rails, or they may be interconnected as shown in FIG. 3.

Thus rails 71 which are parallel to each other are separated from each other and retained in place by separators 73. The separators are secured by bolts 75 to bed 12. The balancing station 19 and the bearing holder 22 are secured to each other in spaced aligned relationship by a U-shaped rod 77 passing through bores 19' and 22'.

Also seen in FIG. 3 is a socket chuck 25 which is seen to extend through bearing member 22 and balancing apparatus 19.

In FIG. 4 parts 22 and 19 are seen without the socket chuck 25 which will be discussed below. Each balancing station 19 comprises an upstanding member 19" having a main body portion 79 which has a generally rectangular configuration and from which downwardly depend a pair of spaced flanges 81 at the outer edges thereof. Each flange 81 includes a throughbore sized to receive one of the rails 71.

Mounted at the top left here, though it could be mirror imaged is a safety restrainer arm 85. Arm 85 is pivotably mounted by a bolt 87 secured by a nut 89. In case of severe imbalance, the restraining arm will maintain the chuck in position thereupon. The arm 85, of a generally rectangular cross section includes a first portion 91 pivotably mounted as above noted. To this is fixedly secured and normal thereto a second portion 92, which in turn is hingedly secured to a third portion 95. An imbalance meter 94 having a probe 93 is mounted in conventional manner through a bore in said first portion 91. Mounted in the third portion 95 is an adjustable electrical contact 97, having a contact point 99, also attached in a conventional manner through a bore in said third portion 95, to which is attached a wire 100 (best seen in FIG. 5) connected to a stroboscopic light 44, (FIG. 1) which light is activated upon electrical circuit completion upon the contact point 99 touching the point of imbalance as is known in the art. The third portion 95 also includes a clevis 101 at the end distal from the hinged connection, the spacing between the arms thereof being slightly wider than the thickness of the main body portion 79.

As shown in FIG. 5, the clevis 101 is secured in a closed position by a quick release pin 103 which to prevent loss is secured by a chain 105 attached conventionally to main body 79.

A chuck receiver 107 (FIG. 4) is mounted on or in the top edge 80 along the length thereof of main body portion 79. Chuck receiver 107 has a flat bottom surface 107B, two sidewalls 107S normal thereto, and a concave top surface 107T, all of which are identified in FIG. 4. The chuck receiver 107 is sized in cross section to mate with that portion of the chuck 25.

Figure 6:
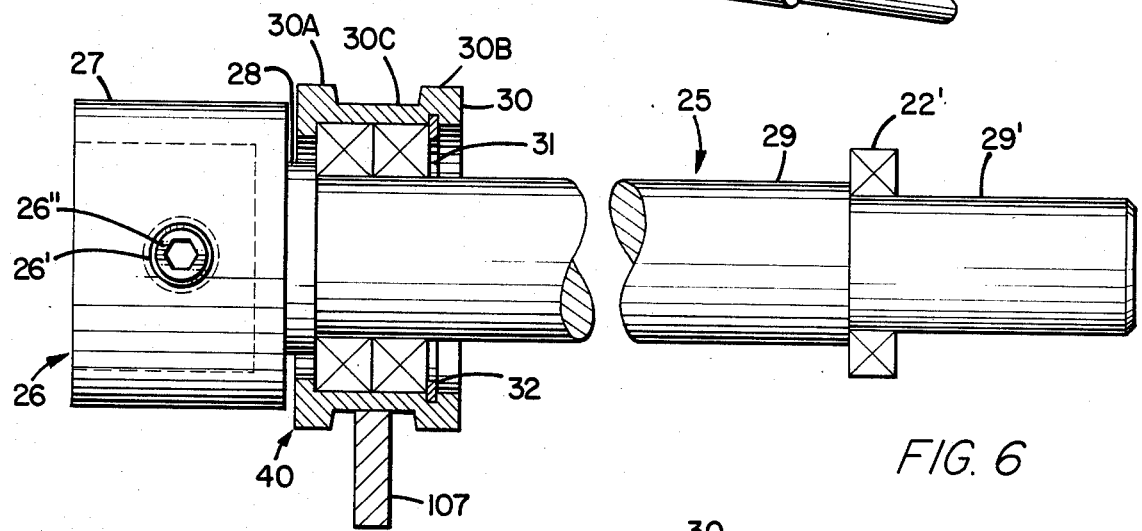
FIG. 6 is a side elevational view of the chuck seen in FIG. 3.
Figure 7:
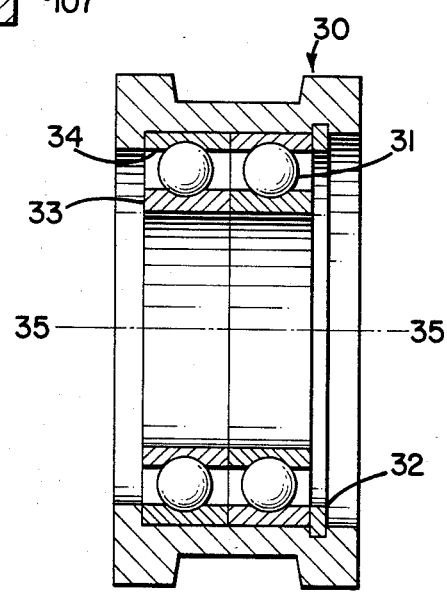
FIG. 7 is a front elevational view partially in cross section of one portion of this invention.

We turn now to FIGS. 6 and 7 for details of the socket chuck 25. Here shaft receiver 26 is an annular cylindrical member having a first portion 27 of a fixed diameter and a second portion 28 of a narrower diameter and a third portion 29 which is not annular and which is adapted and sized to be received by assembly 40 in particular to be fitted adjacent the inner race of ball bearings to be described below.

First portion 27 contains a threaded bore 26' into which is inserted a bolt 26'' which serves to secure the shaft such as a drive shaft within the shaft receiver 26.

Assembly 40 has a rotatable outer shell 30 which preferably has left and right outer sections 30A and 30B having outer diameters greater than the central outer diameter 30C. This facilitates maintenance of the assembly 40 laterally upon concave support member 107.

Outer shell 30 serves as a holder for ball bearings 31. A retainer ring 32 (FIG. 7) is disposed in conventional manner on one side, for the sake of discussion the right side thereof.

The ball bearings 31 are set between an inner race 33 and an outer race 34 per FIG. 7. The ball bearings allow the shaft receiver 26 to rotate since the bearings carry the load on the said inner race 33. The inner race 33 is sized relative to the chuck receiver to addtionally permit motion to occur along the axis of the bearing. Thus, rotary motion and axial motion can both transpire.

When the outer shell 30 is positioned on concave support member 107, lateral motion is restrained only by gravitational force. Unbalance forces generated by rotational velocity cause the geometric axis to follow the rotational axis giving a display of unbalance, as for example in a numerical indicator meter.

Thus if a condition of imbalance exists, a location on the outer shell 30 corresponding to the location of imbalance on the shaft work piece, i.e. at the exact number of degrees of orientation from a fixed point, closes an electrical circuit on contact with the contact point 99 (FIG. 4) of the adjustable electrical contact 97. Since oscillation laterally is equal, the meter gives the degree of imbalance. See FIG. 5.

Returning to FIGS. 5 and 6 it is seen that stationary support 22, which also comprises a ball bearing holder 22', is capable of permitting rotational motion and receiving the far end 29' which in contiguous to section 29 of the shaft receiver 26.

Stationary supports for holding devices that undergo rotational motion therein are well known in the art and need not be discussed at length.

Figure 8:
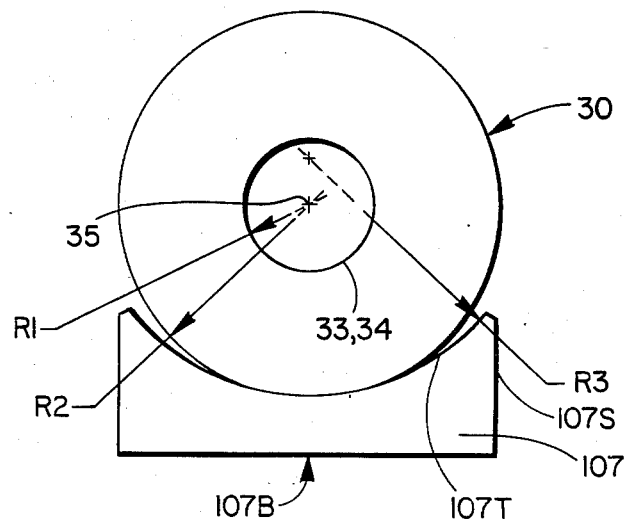
FIGS. 8 and 9 are schematic views of the operation of the drums and support of this invention.

The rocker bearing support system provided at each member 19 is a novel means for displaying unbalance forces in the form of motion. The outer circumference of the cage assembly 40 is intercepted by the chord of a circle of a radius different than that of the cage diameter. The center of the chord is displaced from the center of the rotational member and cage assembly. The chord is formed on a flat plane support. This is shown schematically in FIG. 8 wherein the radius $R_3$ is shown displaced from the normal radius centers, $R_1$ and $R_2$, lying on a vertical centerline.

These two different radius centers $R_3$ and $R_2$ in effect produce a device that seeks a neutral position through the operation of gravity forces, while letting the bearing cage assembly 40 react to motion imparted by unbalance forces exceeding the force of gravity on the work piece being balanced. As rotational speed is imparted, a following motion is produced at the rocker bearing support 107 by use of the rocker bearing support 107 in conjunction with the stationary support 22 which is comprised of self-aligning bearings 23 which allow controlled oscillatory motion.

Figure 9:
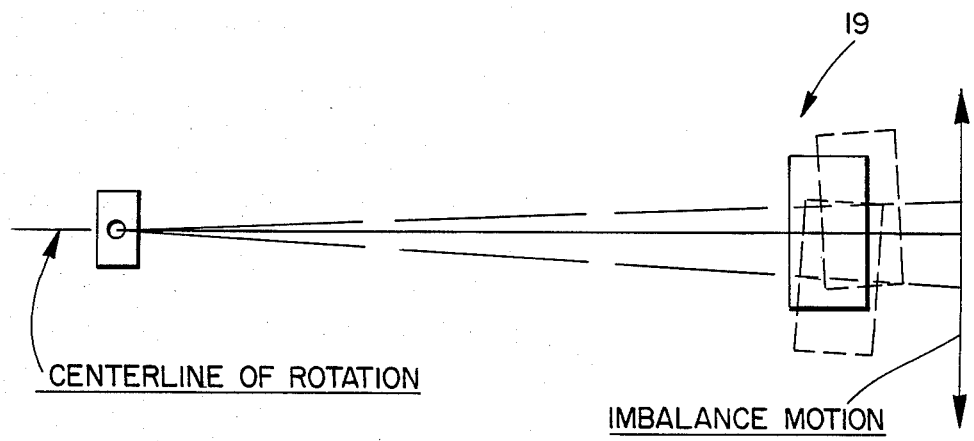

Thus, as shown schematically in FIG. 9, the unbalanced workpiece (held in device 19 along the centerline of rotation 35) provides displacement of the bearing assembly 40 provided by outer shell 30 and inner races 33,34, as shown. That is, the normal solid line position shows the bearing assembly at rest; the dotted line position in FIG. 9 shows the motion of the bearing assembly due to an unbalanced workpiece. The sensitivity to the amount of unbalance may be varied by changing the relationship of the radii. Also, the total weight of the workpiece being tested for unbalance has no effect on the principle of operation. The apparatus may be proportioned to handle any size of rotating device that might be conceivably tested.

The arrangement disclosed has virtually unlimited load carrying capability and yet can still maintain sufficient sensitivity to produce an adequate balance to the workpiece.

As previously mentioned, a meter 94 is provided on apparatus 19 secured conventionally to the restraining arm. A probe 93 is coupled to each meter 94. A knob 96 is also provided on the other side of cage assembly 40 having an electrical contact 97 extending through an opening in the arm into contact at point 99 with the assembly 40.

The contact 97 is coupled via electrical conduit 100 (FIG. 5) to strobe light, FIG. 1, 44, to give an indication of where the unbalance is on the workpiece. That is, knob 96 is rotated to move contact point 99 into contact with assembly 40 when it is at rest. When the workpiece is rotated and, if unbalanced, motion is transmitted to bearing assembly 40, as illustrated in FIG. 9, electrical impulses are transmitted to the strobe light 44 to indicate the degree of unbalance. This as is well known in the art, tells the operator what clock position on the workpiece requires compensating balancing work.

The meter probe 93 also engages the exterior of assembly 40 and measurements, via meter 94, are made of the amount of deflection.

Thus, a workpiece can be mounted in the work station 10 in a first position to permit performance of any machining operation. By then adding apparatus 19 and chuck 25 any balancing work necessary may be carried out quickly and easily. The unique arrangement allows a workpiece to be straightened, welded, balanced, etc. with a minimum time and effort utilizing a single work station. The set up time is appreciably less than in known prior art arrangements using commercial balancers and all balancing is carried out on the workpiece (eg., a drive shaft) in the exact manner as it operates in the vehicle in which it is installed.

The bearing assembly 40 allows rotation on and motion of the workpiece directly or within the shaft receiver carried in inner race 33 (which in turn is seated in a drum 30 of larger radius) to follow motion imparted by any unbalance of the workpiece so that it rocks to and fro until it comes to rest. By the operator adding weights to the workpiece, as indicated by the strobe light position, as by welding, the workpiece can be balanced.

In conclusion it is seen that the rotating drums each have a geometric and a mass center. When the mass and geometric centers are closely coincident, there is an absence of oscillatory load at a frequency coincident with the rotational speed. When significant departures of the geometric and mass centers occur, unbalance forces are generated. The magnitude of force generated is a function of mass unbalance and the speed, squared. Because of the speed squared relationship, dynamic (rotational) balance is extremely important in all machinery and vehicles. High loads and resultant distress is imparted by the unbalanced rotational member to support bearings and fixtures resulting in excessive wear, distress, and, in many cases, operator discomfort. Because of this fact, it is important to test many rotational members for the presence of unbalance and to provide a means of verifying that corrective steps have been taken.

Although the dynamic balancing apparatus 19 has been disclosed herein in the environment of a work station to carry out operations on a workpiece, such as a drive shaft, the balancing apparatus 19 can be used independently of the work station 10. The size can be varied to accommodate any size of workpiece.

While all of the previous discussion has related to the use of a shaft receiver which moves in conjunction with the assembly 40, in rotational motion, which receiver receives a shaft workpiece, it is readily seen that the actual shaft itself can be interposed into assembly 40, and also held in the tailstock, i.e., stationary support 22 for the determinations of imbalance previously discussed.

It is obvious that while the station depicted in FIG. 3 et seq shows aligned parallel bores for use on rails, that a mount system similar to that shown in the prior art work station of FIG. 1, i.e. one not using parallel tubular rails, could be employed with no effect on the operability of the structure. If desired, as seen in FIG. 1, a vertical mid support may be provided for the workpiece being worked on in the form of a vertical support 52 extending upwardly from bed 12 terminating at the top in a workpiece engaging member 53' adapted to engage the workpiece and support the same.

Since certain changes may be made in the above apparatus without departing from the scope of the invention herein involved, it is intended that all matter contained in the above description and shown in the accompanying drawings shall be interpreted as illustrative and not in a limiting sense.

We claim:

1. A balancing station for use in a work station for working on workpieces or the like, said work station having a frame including a support bed, a tailstock, mounted on said support bed, a headstock mounted on said support bed, and spaced from said tailstock,
   a means in said frame for slidably moving said headstock toward said tailstock,
   strobe light means mounted on said work station for determining the movement of the central longitudinal axis of a workpiece,
   the tailstock or headstock comprising a vertical generally planar member having a concave support mounted thereon and adapted to receive a bearing assembly, and
   said bearing assembly having an outer shell containing bearings set between an inner race and an outer race,
   wherein said radius of curvature of said concave support is different from the radius of curvature of said outer shell,
   said outer shell of said assembly rotating within the curve of said concave support during rotation of a workpiece supported by said bearing assembly.

2. The balancing station of claim 1 wherein the vertical member also includes a hinged restraining arm adapted to maintain the assembly within the concave support.

3. The balancing station of claim 2 wherein a first probe means mounted in said restraining arm is coupled electrically to said strobe means and is adapted to transmit changes in coincidence of the central axis of a workpiece to said strobe light means.

4. The balancing station of claim 2 wherein a second probe is coupled to a meter mounted on said station to register the degree of oscillation of said workpiece.

5. The balancing station of claim 3 wherein a second probe is coupled to a meter mounted in said arm of said station to register the degree of oscillation of said workpiece.

6. The balancing station of claim 2 wherein said assembly has a shaft receiver coupled thereto, said shaft receiver comprising a first annular cylindrical portion, having a threaded bore adapted to receive means for securing a shaft into said shaft receiver,
   said shaft receiver also including an elongated portion adapted for engagement with a second bearing assembly.

7. The balancing station of claim 5 wherein said vertical member includes a pair of horizontally aligned bores through the thickness thereof, at one end thereof for relocating said vertical member along the bed of the work station.

8. The balancing station of claim 2 wherein the restraining arm includes a pivotally mounted L-shaped first portion and a hingedly secured second portion hinged to said L-shaped first portion, said L-shaped first portion being mounted on one side of said vertical member, and the second portion being securable at its non-hinged end to said vertical member.

9. The station of claim 8 wherein the non-hinged end of said second portion has a clevis thereon for securing said second portion to said vertical member.

* * * * *